United States Patent [19]
Tallmadge et al.

[11] Patent Number: 5,950,277
[45] Date of Patent: Sep. 14, 1999

[54] LOAD BEARING GROMMET ASSEMBLY

[75] Inventors: Bruce J. Tallmadge, Winchester, Va.; Jeffrey L. Rice, Chambersburg, Pa.

[73] Assignee: Lear Corporation, Southfield, Mich.

[21] Appl. No.: 09/023,331

[22] Filed: Feb. 13, 1998

[51] Int. Cl.$^6$ .................................................. F16L 5/00
[52] U.S. Cl. .......................................... 16/2.1; 174/153 G
[58] Field of Search ...................... 16/2.1, 2.2; 174/56 G, 174/152 G, 153 G; 411/508, 511, 512

[56] References Cited

U.S. PATENT DOCUMENTS

| | | | |
|---|---|---|---|
| 2,816,951 | 12/1957 | Sperry | 174/153 G |
| 3,200,694 | 8/1965 | Rapata | 411/508 |
| 3,665,548 | 5/1972 | Mason . | |
| 3,768,115 | 10/1973 | Hoffmann et al. . | |
| 3,887,960 | 6/1975 | Sherman | 16/2.1 |
| 4,033,535 | 7/1977 | Moran | 174/153 G |
| 4,137,602 | 2/1979 | Klumpp, Jr. . | |
| 4,282,627 | 8/1981 | Downing . | |
| 4,656,689 | 4/1987 | Dennis | 16/2.1 |
| 4,869,454 | 9/1989 | Byrne et al. | 16/2.1 |
| 5,003,130 | 3/1991 | Danforth et al. . | |
| 5,069,586 | 12/1991 | Casey | 411/339 |
| 5,071,143 | 12/1991 | Byerly et al. . | |
| 5,659,924 | 8/1997 | Gildersleeve . | |
| 5,772,380 | 6/1998 | Cloud et al. | 411/508 |
| 5,806,139 | 9/1998 | Anderson et al. . | |

*Primary Examiner*—Chuck Y. Mah
*Attorney, Agent, or Firm*—Brooks & Kushman PC

[57] ABSTRACT

A grommet assembly for providing a location for a fastener to attach a cover member to a support structure includes first and second flange members. The flange members are sonically weldable to each other and are adapted to sandwich the cover member therebetween. Each of the flange members defines a passageway portion and has a recess portion. At least one of the flange members has a plurality of protrusions. The first and second flange members, upon being sonically welded together, cooperate to define a passageway with the passageway portions, and further cooperate to define a recess with the recess portion. The passageway is adapted to receive the fastener, and the recess is adapted to receive the cover member. The protrusions extend into the passageway and are engageable with the fastener.

22 Claims, 4 Drawing Sheets

Fig. 3a  Fig. 4a

LOAD BEARING GROMMET ASSEMBLY

TECHNICAL FIELD

This invention relates to a two-piece load bearing grommet for providing a support location to accommodate a fastening member.

BACKGROUND ART

Grommets may be used to accommodate fasteners passing through a cover member. For applications which require relatively high load bearing capability, such as when grommets are used for providing locations for bolts or studs to attach a cover member to a firewall of a motor vehicle, grommets are conventionally formed as single pieces of metal. Metal is the material of choice due to its high strength. Such grommets are usually cast, wrought, extruded, or forged, and then machined to obtain the desired final shape and finish. Because of the multiple manufacturing steps, however, such grommets are costly to manufacture. Conventional grommets are also relatively heavy, and do not attenuate sound or vibrations that may emanate from a source such as an engine.

Furthermore, because conventional grommets are single pieces which are inserted into openings in a cover member, modifications are typically required to the cover member in order to facilitate insertion of the grommets. These modifications may include tapering the cover member around the edges of the openings. Such modifications, however, reduce the strength of the cover member around the edges of the openings, and reduce the noise attenuation capability of the cover member. In addition, the grommets typically fit loosely in the cover member and, therefore, the grommets can be easily displaced during handling and assembly.

SUMMARY OF THE INVENTION

Accordingly, it is an object of the present invention to provide a lightweight, two-piece grommet assembly which can withstand a compressive, axially applied load of about 10,000 pounds.

It is another object of the present invention to provide a grommet assembly which is relatively lighter than metal.

It is another object of the present invention to provide a grommet assembly which is relatively inexpensive to manufacture.

It is another object of the present invention to provide a grommet assembly which attenuates sound and vibrations.

It is yet another object of the present invention to provide a grommet assembly which can easily be inserted into a cover member, without requiring additional modifications to the cover member.

These and related objects may be achieved through use of a novel load bearing grommet assembly herein disclosed. The load bearing grommet assembly provides a location for a fastener to attach a cover member to a support structure, and comprises first and second flange members. The flange members are joinable to each other and are adapted to sandwich the cover member therebetween. Each of the flange members defines a passageway portion and has a flange portion, and each of the flange members is made of a plastic material which enables the flange members to cooperate with each other to effect the joining of the flange members at the time the cover member is sandwiched therebetween. The first and second flange members upon being joined cooperate to define a passageway with the passageway portions, and further cooperate to define a recess with the flange portions. The passageway is adapted to receive the fastener and the recess is adapted to receive the cover member.

In one embodiment of the grommet assembly, one of the flange members has a groove and the other of the flange members has a projection engageable with the groove. In a second embodiment of the grommet assembly, each of the flange members further includes an outer projection engageable with each other, and one of the flange members has a projection for spacing the grommet away from the support structure.

The foregoing and other objects, advantages and features of the present invention will be more readily apparent to those skilled in the art after review of the best mode for carrying out the invention, taken together with the drawings.

BRIEF DESCRIPTION OF THE DRAWINGS

FIG. 3a is an enlarged cross-sectional view of a portion of one of the two pieces of the grommet assembly;

FIG. 4a is an enlarged cross-sectional view of a portion of one of the two pieces of the second embodiment of the grommet assembly.

BEST MODES FOR CARRYING OUT THE INVENTION

Figure 1:
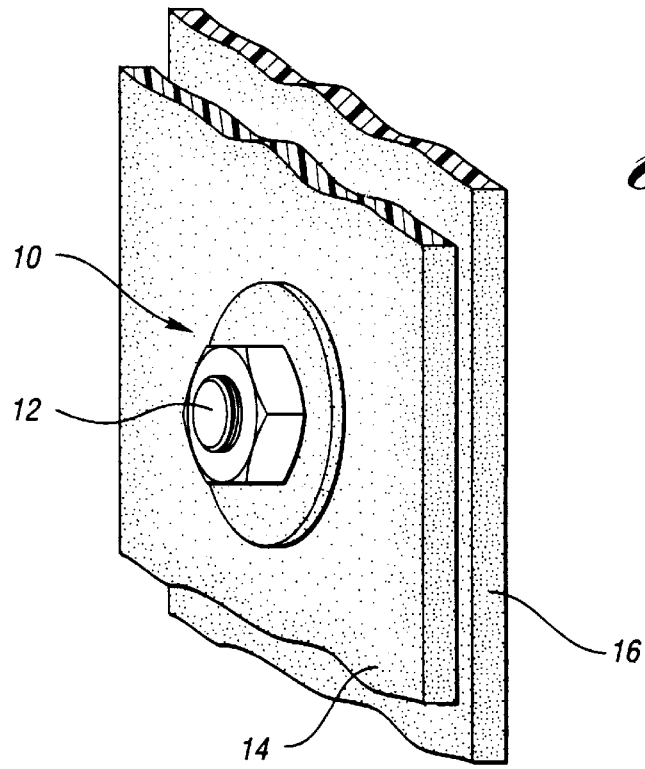
FIG. 1 is a perspective view of a two-piece grommet assembly according to the present invention mounted in a motor vehicle dash mat, with a fastener passing through the grommet for attaching the dash mat to a vehicle firewall.
Figure 2:
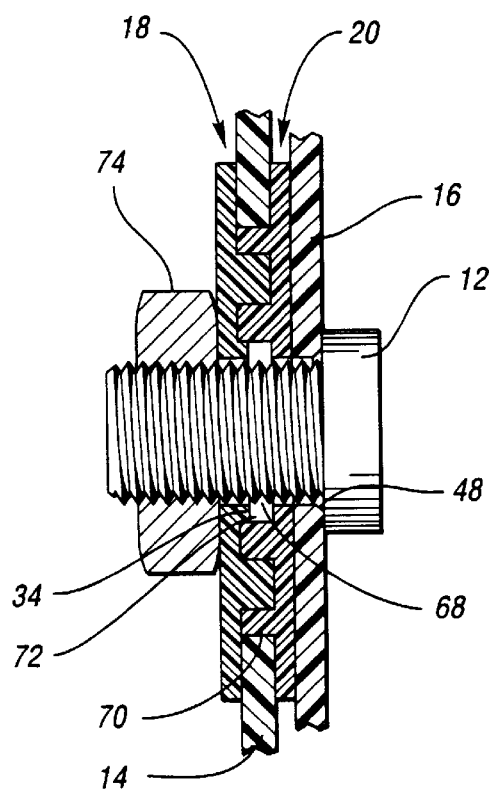
FIG. 2 is a cross-sectional view of the grommet assembly mounted in the dash mat, with the fastener passing through the grommet assembly for attaching the dash mat to the vehicle firewall.
Figure 3:
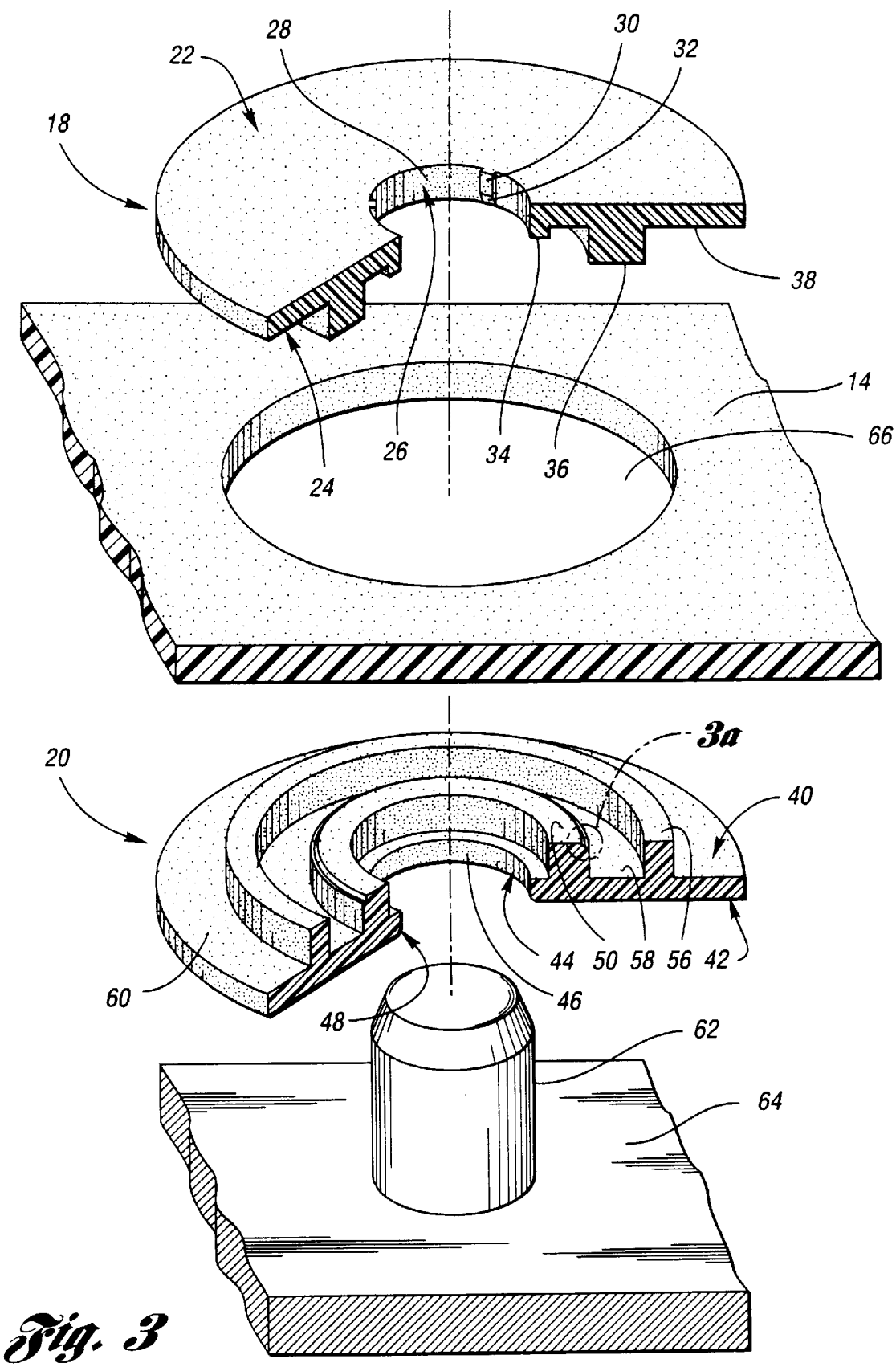
FIG. 3 is an exploded perspective view of the grommet assembly, partially cut away, with the dash mat disposed between the two pieces, and a die with a locating pin disposed beneath the two pieces.

With reference to the drawings, the preferred embodiments of the invention will be described. FIGS. 1–3 show a first two-piece grommet assembly 10 according to the present invention. The grommet assembly 10 provides a location for a fastener, such as a stud or bolt 12, to attach a cover member, such as a dash mat 14, to a support structure such as a motor vehicle firewall 16. The grommet assembly 10 comprises first and second flange members 18 and 20, respectively, which are adapted to sandwich the dash mat 14 therebetween.

The first flange member 18 is preferably generally circular, and has a generally planar first or upper surface 22, a second or lower surface 24 and a generally cylindrical inner surface 26 defining a passageway portion 28 through the flange member 18. A plurality of protrusions 30 extend radially inwardly from the inner surface 26, and are provided with beveled surfaces 32 to facilitate engagement with the bolt 12. A first or inner annular projection 34 extending normally from the lower surface 24 is disposed proximate the perimeter of the passageway portion 28. A second or outer annular projection 36 extending normally from the lower surface 24 is disposed radially outwardly of the inner annular projection 34. A flange portion 38 is disposed radially outwardly from the outer annular projection 36.

The second flange member 20 is also preferably generally circular, and has a first or upper surface 40, a generally planar second or lower surface 42 and a generally cylindrical inner surface 44. The inner surface 44 defines a second passageway portion 46 through the second flange member 20, and preferably has a beveled surface 48. A first or inner annular projection 50 extending normally from the upper surface 40 is disposed radially outwardly of the passageway portion 46. The inner annular projection 50 preferably has a chamfer or notch 52 and a lateral portion 54, as shown in greater detail in FIG. 3a. The notch 52 is configured to direct sonic energy to the lateral portion 54, as described below in greater detail. A second or outer annular projection 56 extending normally from the upper surface 40 is disposed radially outwardly of the inner annular projection 50. The inner annular projection 50 and the outer annular projection 56 define a channel or groove 58 which is engageable with the outer annular projection 36 of the first flange member 18. A flange portion 60 is disposed radially outwardly from the outer annular projection 54.

The flange members 18 and 20 preferably comprise high strength plastic with a compressive strength of about 40,000 pounds per square inch (psi) or greater. Plastic also provides the present invention with several advantages over metal, including lighter weight and better sound and vibration attenuation properties. A plastic suitable for this application is AMODEL™ AS-1145 HS glass reinforced heat stabilized polyphthalamide resin available from Amoco Performance Products, Inc. of Alpharetta, Ga. Alternatively, the flange members 18 and 20 may be made of any material characterized as being sonically weldable while providing the necessary compressive strength, which may be more or less than 40,000 psi depending on design requirements for a particular application. The flange members 18 and 20 may be formed by conventional injection molding, or by any other process known by those skilled in the art.

To assemble the grommet assembly 10, the second flange member 20 is preferably placed over a locating pin 62 and into a conventional die 64, as shown in FIG. 3. The dash mat 14, having an opening 66, is then placed over the second flange member 20, such that the outer annular projection 56 extends through the opening 66. The outer annular projection 56 is preferably sized and shaped to fit closely against the sidewall of the opening 66 to minimize relative movement of the second flange member 20 with respect to the dash mat 14. The first flange member 18 is then placed over the locating pin 62, and the outer annular projection 36 of the first flange member is aligned with the groove 58 of the second flange member 20.

Next, the flange members 18 and 20 are preferably sonically welded together by utilizing a conventional sonic welding apparatus (not shown). The sonic welding apparatus is preferably placed above the first flange member 18 as oriented in FIG. 3, and emits sonic energy downwardly toward the first flange member. The sonic energy is transmitted through the first flange member 18 to the second flange member 20. The notch 52 of the second flange member 20 directs the sonic energy along the lateral portion 54 of projection 50, whereby the sonic energy melts a portion of the projection 50. The flange members 18 and 20 are then automatically or otherwise forced together to form the grommet assembly 10, wherein the passageway portions 28 and 46 cooperate to define a passageway 68 adapted to receive the bolt 12, and the flange portions 38 and 60 cooperate to define a recess 70 adapted to receive the dash mat 14.

Alternatively, the flange members 18 and 20 may be welded together using any other suitable welding process, or they may be joined to each other by an interference fit, an adhesive, or in any other manner known by those skilled in the art. An interference fit or snap fit may be achieved, for example, by forcing the outer annular projection 36 of the first flange member 18 into the groove 58 of the second flange member 20.

The inner annular projection 34 of the first flange member 18 is preferably configured in a manner such that a gap 72 is formed between the inner annular projection 34 and the upper surface 40 of the second flange member 20 when the flange members 18 and 20 are joined together, as shown in FIG. 2. The gap 72 serves to reduce the weight of the grommet assembly 10. Alternatively, a gap or gaps may be formed elsewhere in the grommet assembly 10 to reduce weight or to contain molten plastic or other material generated during the sonic welding process.

After the grommet assembly 10 has been installed in the dash mat 14, the grommet assembly may be placed over the bolt 12, which extends outwardly from the firewall 16. The beveled surface 48 of the second flange member 20 guides the bolt 12 into the passageway 68 of the grommet assembly 10. The protrusions 30 of the first flange member 18 engage the bolt 12 to prevent the grommet assembly 10 from sliding off the bolt. Consequently, a keeper washer or similar device is not required to hold the grommet assembly 10 in place. A nut 74 is then fastened on the bolt 12 to secure the dash mat 14 to the firewall 16. A mounting bracket (not shown) for supporting other parts may also be placed between the grommet assembly 10 and the nut 74. A plurality of grommet assemblies 10 and bolts 12, or other fasteners, are typically required to attach the dash mat 14 to the firewall 16. Each grommet assembly 10 is preferably configured to withstand a compressive, axially applied load of about 10,000 pounds. Of course, each grommet assembly 10 can be configured to withstand a smaller or larger axially applied load depending on the particular design requirements.

Figure 5:
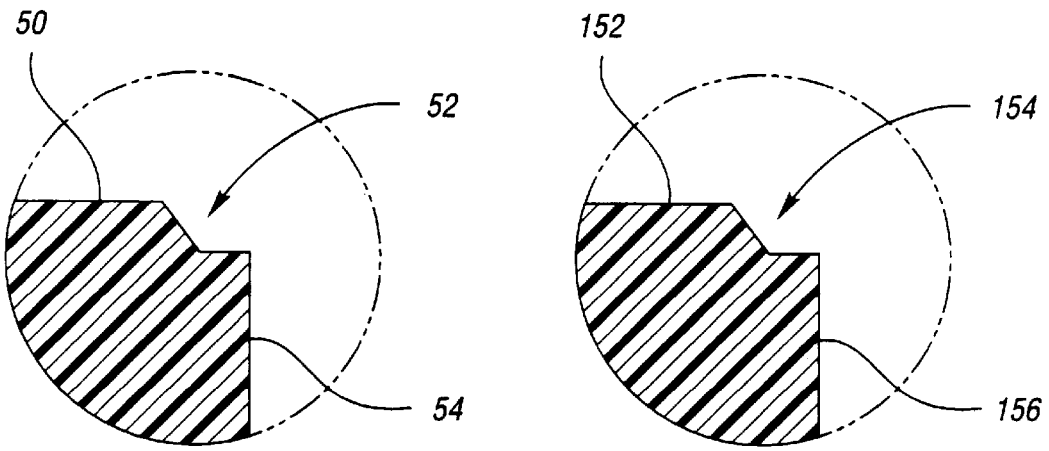
FIG. 5 is a cross-sectional view of the second embodiment of the grommet assembly mounted in the dash mat, with a fastener passing through the grommet assembly for securing the dash mat to the vehicle firewall.
Figure 5:
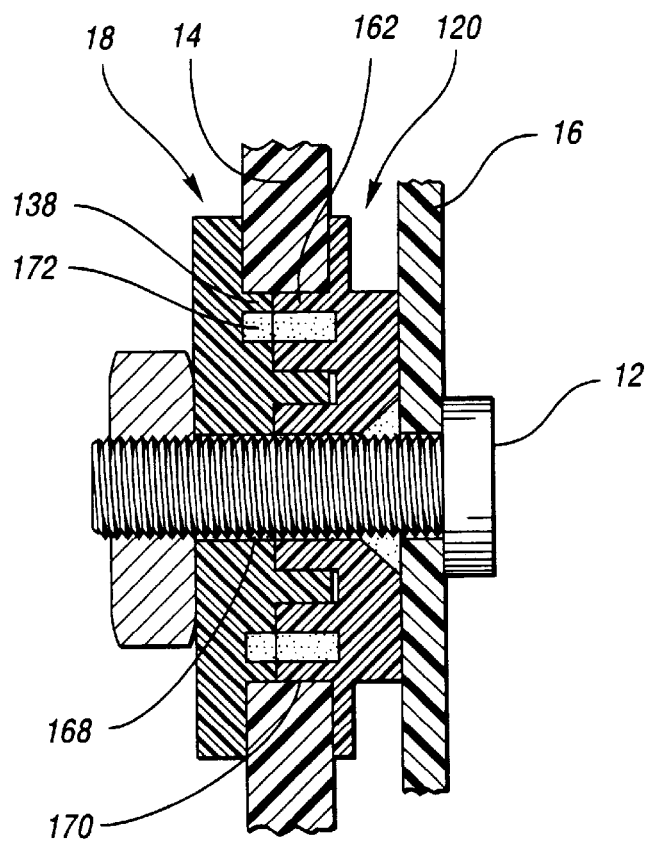
Figure 4:
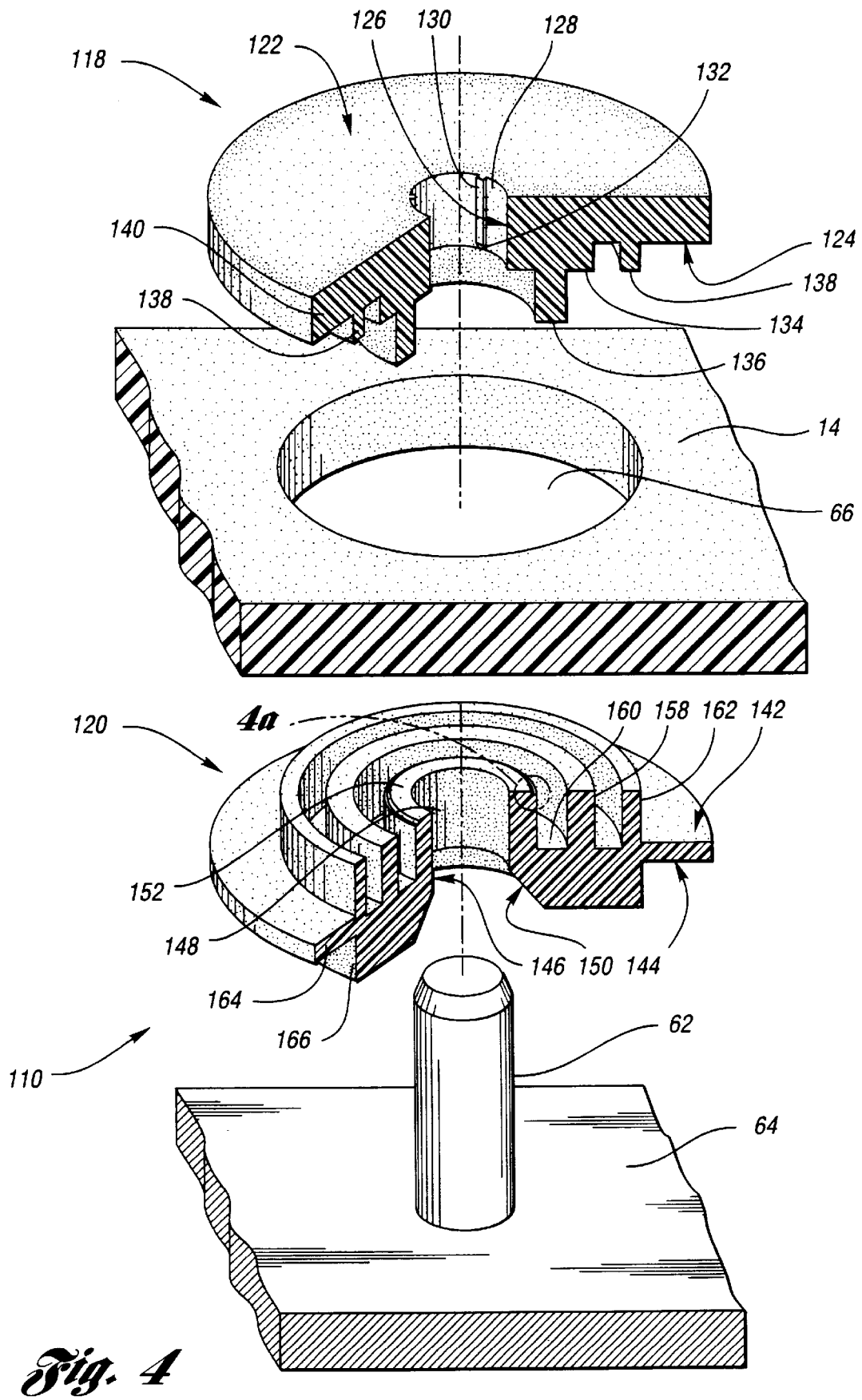
FIG. 4 is an exploded perspective view similar to FIG. 3 of a second embodiment of the two-piece grommet assembly.

FIGS. 4 and 5 show a second embodiment 110 of the grommet assembly, which comprises first and second flange members 118 and 120, respectively. The flange members 118 and 120 are both preferably made of a material similar to that disclosed with respect to the first embodiment 10 of the grommet assembly.

The first flange member 118 is preferably generally circular, and has a generally planar first or upper surface 122, a second or lower surface 124 and a generally cylindrical inner surface 126 defining a passageway portion 128 through the flange member 118. A plurality of protrusions 130 extend radially inwardly from the inner surface 126, and are provided with beveled surfaces 132 to facilitate engagement with the bolt 12. A first or inner annular projection 134 extending normally from the lower surface 124 is disposed proximate the perimeter of the passageway portion 128, and has an annular extension 136. A second or outer annular projection 138 extending normally from the lower surface 124 is disposed radially outwardly of the inner annular projection 134. A flange portion 140 is disposed radially outwardly from the outer annular projection 138.

The second flange member 120 is also preferably generally circular, and has a first or upper surface 142, a second or lower surface 144 and a generally cylindrical inner surface 146. The inner surface 146 defines a second passageway portion 148 through the second flange member 120, and preferably has a beveled surface 150. A first or inner annular projection 152 extending normally from the upper surface 142 is disposed proximate the perimeter of the passageway portion 148. The inner annular projection 152 preferably has a chamfer or notch 154 and a lateral portion 156, as shown in FIG. 4a. The notch 154 is configured to direct sonic energy to the lateral portion 156. A second or middle annular projection 158 extending normally from the upper surface 142 is disposed radially outwardly of the inner annular projection 152. The inner annular projection 152 and the middle projection 158 define a channel or groove 160 which is engageable with the annular extension 136 of the inner annular projection 134 of the first flange member 118. A third or outer annular projection 162 extending normally from the upper surface 142 is disposed radially outwardly of the middle annular projection 158. A flange portion 164 is disposed radially outwardly from the outer annular projection 162. An annular projection 166 extends normally from the lower surface 144, and is configured to space the remainder of the second flange member 120 away from the firewall 16.

To assemble the grommet assembly 110, the second flange member 120 is preferably placed over the locating pin 62 and into the conventional die 64. The dash mat 14, having the opening 66, is then placed over the second flange member 120, such that the outer annular projection 162 extends through the opening 66. The outer annular projection 162 is preferably sized and shaped to fit closely against the sidewall of the opening 66 to minimize relative movement of the second flange member 120 with respect to the dash mat 14. The first flange member 118 is then placed over the locating pin 62, and the annular extension 136 of the inner annular projection 134 of the first flange member is aligned with the groove 160 of the second flange member 120.

Next, the flange members 118 and 120 are sonically welded together by utilizing a conventional sonic welding apparatus (not shown). The sonic welding apparatus is preferably placed above the first flange member 118 as oriented in FIG. 4, and emits sonic energy downwardly toward the first flange member. The sonic energy is transmitted through the first flange member 118 to the second flange member 120. The notch 154 of the second flange member 120 directs the sonic energy along the lateral portion 156 of the inner annular projection 152, whereby the sonic energy melts a portion of the inner annular projection 152. The flange members 118 and 120 are then automatically or otherwise forced together to form the grommet assembly 110, wherein the passageway portions 128 and 148 cooperate to define a passageway 168 adapted to receive the bolt 12, and the flange portions 140 and 164 cooperate to define a recess 170 adapted to receive the dash mat 14, as shown in FIG. 5.

Alternatively, the flange members 118 and 120 may be welded together using any other suitable welding process, or they may be joined to each other by an interference fit, an adhesive, or in any other manner known by those skilled in the art. An interference fit or snap fit may be achieved, for example, by forcing the annular extension 136 of the first flange member 118 into the groove 160 of the second flange member 120.

The outer annular projections 138 and 162 are preferably configured in a manner such that a void space or gap 172 is formed radially inward of the projections 138 and 162 when the flange members 118 and 120 are joined together, as shown in FIG. 5. The gap 172 may be used to contain molten plastic or other material generated during the sonic welding process. The gap 172 may also serve to reduce the weight of the grommet assembly 110. Alternatively, a gap or gaps may be formed elsewhere in the grommet assembly 110 to contain molten material generated during the welding process or to reduce weight of the grommet assembly.

The invention has been described in an illustrative manner, and it is to be understood that the terminology which has been used is intended to be in the nature of words of description rather than of limitation. Obviously, many modifications and variations of the invention are possible in light of the above teachings. It is, therefore, to be understood that within the scope of the appended claims, the invention may be practiced otherwise than as specifically described.

What is claimed is:

1. A load bearing grommet assembly for providing a location for a fastener to attach a cover member to a support structure, the grommet assembly comprising:

first and second flange members joinable to each other and adapted to sandwich the cover member therebetween, each of said flange members defining a passageway portion and having a flange portion, each of said flange members being made of a plastic material which enables said flange members to cooperate with each other to effect the joining of said flange members at the time said cover member is sandwiched therebetween, said second flange member having first and second axially-extending projections defining a groove, and said first flange member having a first axially-extending projection engageable with said groove;

wherein said first and second flange members upon being joined cooperate to define a passageway with said passageway portions, and further cooperate to define a recess with said flange portions, said passageway being adapted to receive the fastener and said recess being adapted to receive the cover member.

2. The grommet assembly of claim 1 wherein said plastic material of the grommet is configured to withstand a compressive, axially applied load of 10,000 pounds.

3. The grommet assembly of claim 1 wherein at least one of said flange members has at least one protrusion extending into said passageway, said protrusion being engageable with the fastener.

4. The grommet assembly of claim 1 wherein said flange members are joined by an interference fit.

5. The grommet assembly of claim 1 wherein said flange members are joined by an adhesive.

6. The grommet assembly of claim 1 wherein said flange members are welded together.

7. The grommet assembly of claim 1 wherein said flange members are sonically welded together.

8. The grommet assembly of claim 1 wherein one of said flange members has a projection for spacing said one flange member away from the support structure.

9. The grommet assembly of claim 1 wherein one of said first and second projections of said second flange member has a sloped surface for directing sonic energy.

10. The grommet assembly of claim 1 wherein said first flange member has a second axially-extending projection and said second flange member has a third axially-extending projection engageable with said second projection of said first flange member.

11. The grommet assembly of claim 10 wherein one of said projections has a sloped surface for directing sonic energy.

12. The grommet assembly of claim 11 wherein said flange members are sonically welded together.

13. The grommet assembly of claim 10 wherein said first and second projections of said first flange member and said first, second and third projections of said second flange member are annular.

14. The grommet assembly of claim 10 wherein said second projection of said first flange member and said third projection of said second flange member are configured such that a gap is formed radially inwardly of said second and third projections of said first and second flange members, respectively, when said flange members are joined together.

15. The grommet assembly of claim 1 wherein said first projection of said first flange member and said first and second projections of said second flange member are annular.

16. In combination, a cover member and a load bearing two-piece grommet sandwiching said cover member therebetween to form a unitary structural assembly for attachment to a support structure;

said two pieces being first and second flange members joinable to each other, each of said flange members defining a passageway portion and having a flange portion, each of said flange members being made of a plastic material which enables said flange members to cooperate with each other to effect the joining of said flange members at the time said cover member is sandwiched therebetween to form said structural assembly, said second flange member having first and second axially-extending projections defining a groove, and said first flange member having a first axially-extending projection engageable with said groove;

wherein said first and second flange members upon being joined cooperate to define a passageway with said passageway portions, and further cooperate to define a recess with said flange portions to receive said cover member, said passageway being adapted to receive a fastener for the attachment of said unitary structural assembly to the support structure.

17. The combination of claim 16 wherein one of said flange members has a sloped surface for directing sonic energy, and said flange members are sonically welded together.

18. The combination of claim 16 wherein said first flange member has a second axially-extending projection, and said second flange member has a third axially-extending projection engageable with said second projection of said first flange member.

19. In combination, a cover member and a load bearing two-piece grommet sandwiching said cover member therebetween to form a unitary structural assembly for attachment to a support structure by a fastener;

said two pieces being first and second flange members sonically weldable to each other, each of said flange members defining a passageway portion and having a flange portion, at least one of said flange members having a sloped surface for directing sonic energy;

wherein said first and second flange members upon being sonically welded together cooperate to define a passageway with said passageway portions and further cooperate to define a recess with said flange portions, said passageway being adapted to receive the fastener, said recess receiving said cover member, said at least one protrusion extending into said passageway.

20. A load bearing grommet assembly for providing a location for a fastener to attach a cover member to a support structure, the grommet assembly comprising:

first and second flange members joinable to each other and adapted to sandwich the cover member therebetween, each of said flange members defining a passageway portion and having a flange portion, each of said flange members being made of a plastic material which enables said flange members to cooperate with each other to effect the joining of said flange members at the time said cover member is sandwiched therebetween, one of said flange members having first and second projections defining a groove, the other of said flange members having a projection engageable with said groove, and one of said first and second projections having a sloped surface for directing sonic energy;

wherein said first and second flange members upon being joined cooperate to define a passageway with said passageway portions, and further cooperate to define a recess with said flange portions, said passageway being adapted to receive the fastener and said recess being adapted to receive the cover member.

21. A load bearing grommet assembly for providing a location for a fastener to attach a cover member to a support structure, the grommet assembly comprising:

first and second flange members joinable to each other and adapted to sandwich the cover member therebetween, each of said flange members defining a passageway portion and having a flange portion, each of said flange members being made of a plastic material which enables said flange members to cooperate with each other to effect the joining of said flange members at the time said cover member is sandwiched therebetween, said second flange member having first, second and third projections, said first and second projections of said second flange member defining a groove, said first flange member having first and second projections, said first projection of said first flange member being engageable with said groove, said second projection of said first flange member being engageable with said third projection of said second flange member;

wherein said first and second flange members upon being joined cooperate to define a passageway with said passageway portions, and further cooperate to define a recess with said flange portions, said passageway being adapted to receive the fastener and said recess being adapted to receive the cover member.

22. The grommet assembly of claim 21 wherein one of said projections has a sloped surface for directing sonic energy, and said flange members are sonically welded together.

* * * * *